May 22, 1956 — R. L. SINCLAIR — 2,746,616
VEHICLE PARKING DEVICE
Filed Nov. 28, 1952
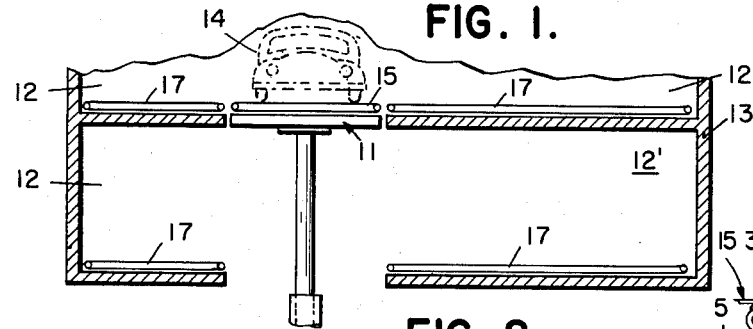
FIG. 1.
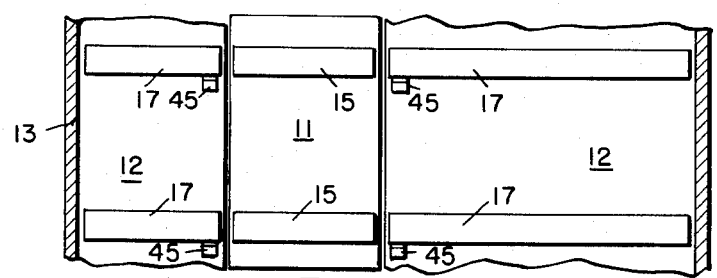
FIG. 2.
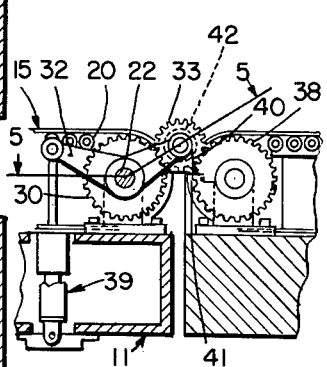
FIG. 4.
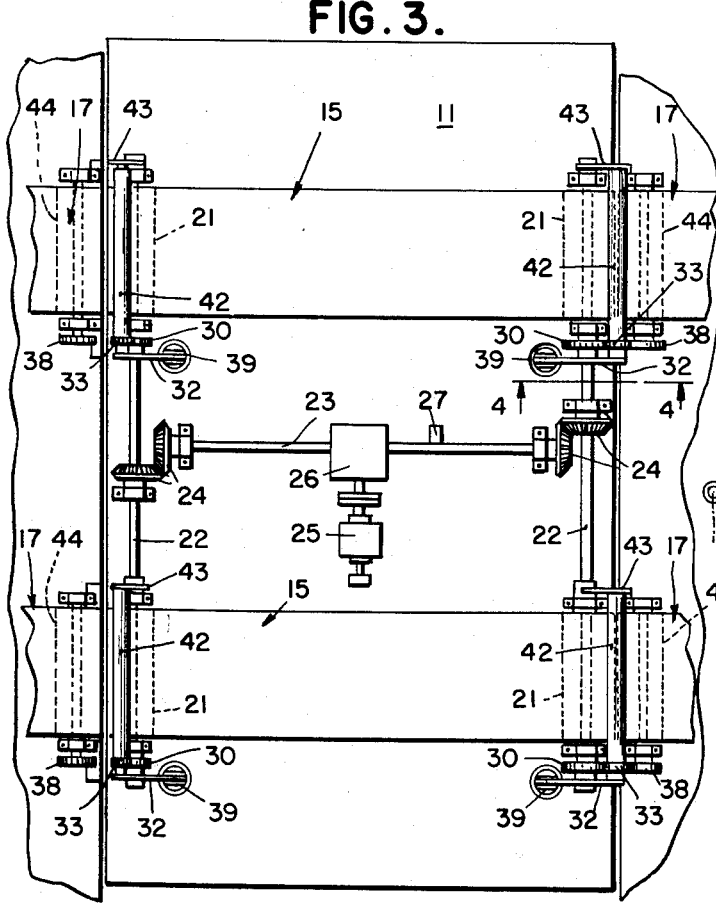
FIG. 3.
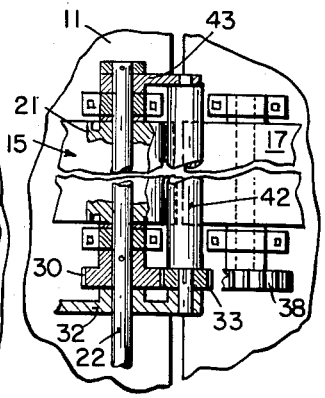
FIG. 5.
FIG. 6.
INVENTOR
RICHARD L. SINCLAIR
BY
Mason & Graham
ATTORNEYS United States Patent Office 2,746,616
Patented May 22, 1956

2,746,616

VEHICLE PARKING DEVICE

Richard L. Sinclair, Compton, Calif.

Application November 28, 1952, Serial No. 323,043

1 Claim. (Cl. 214—16.1)

This invention has to do with the art of handling materials and articles and more particularly with apparatus for the automatic parking of automobiles in storage stalls provided for the purpose.

Various types of automatic and semi-automatic apparatus have been developed for moving automobiles and other motor vehicles from a reception area to selected storage areas and subsequently returning them to the reception area. Examples of such apparatus are disclosed in my applications for patent which resulted in Patents 2,428,856 and 2,602,557.

An object of my present invention is to provide an improved, novel, and relatively simple system and apparatus for automatically parking automobiles and the like in given storage areas or stalls which may be located at different elevations.

A particular object is to provide means for moving automobiles and the like embodying a platform which may be part of an elevator upon which the automobile is moved and a plurality of storage stalls with which the platform can be aligned selectively and means on the platform for supporting and moving the automobile, preferably sidewise, into or out of a storage stall.

A further object is to provide in apparatus of the type indicated, a movable platform having automobile-supporting means thereon and a plurality of storage areas or stalls with automobile-supporting means therein, together with means for coordinating and moving the automobile-supporting means of the platform and the automobile-supporting means of a selected storage stall for movement of an automobile in a given direction.

More particularly it is an object to provide in a parking apparatus for automobiles embodying an elevator and a plurality of parking stalls arranged upon different floors at different elevations, endless conveyor means on the elevator for movement transversely of the elevator and what may be termed idler endless conveyor means in the storage stalls, and means for operatively driving the endless conveyor means of the stalls in synchronization with the conveyor means on the elevator.

These and other objects will be apparent from the drawing and the following description.

Referring to the drawing:

Fig. 1 is a fragmentary sectional elevational view; diagrammatic in character illustrating the invention;

Fig. 2 is a sectional plan view of the structure shown in Fig. 1;

Fig. 3 is an enlarged fragmentary plan view of the elevator and portions of adjacent storage stalls;

Fig. 4 is a fragmentary sectional view on the line 4—4 of Fig. 3;

Fig. 5 is a fragmentary sectional view on line 5—5 of Fig. 4; and

Fig. 6 is a diagrammatic representation of a brake and release means.

More particularly describing the invention, in general I provide a movable support 11 which for purposes of illustration has been shown as an elevator, and associated with this a plurality of storage areas or stalls 12 and a reception area 12' with which the platform or elevator can be aligned selectively, the storage areas or stalls being shown as within a building or other structure 13.

On the platform 11 I provide means for supporting and moving sidewise a vehicle 14. This means comprises, in the form of the invention shown, a pair of laterally spaced endless conveyors, indicated by numeral 15, together with suitable drive mechanism therefor which will later be described. An automobile to be parked may be driven directly onto the platform 11 so that the front wheels are on one of the conveyors and the rear wheels on the other, however, for convenience I prefer to load the elevator from the side as will be explained later. In this connection the conveyors should be made wide enough to accommodate cars having different wheel bases. It is also possible to use a single wide belt in place of the two shown if desired.

The storage stall areas and the reception area are each provided with a pair of endless conveyors, these being indicated by numeral 17.

Referring now to the platform 11, for the purpose of simplifying the illustration the endless conveyors 15 have been shown as belts supported upon a plurality of rollers 20 between their ends, the belts passing around rolls 21 fixedly secured to shafts 22. In actual practice it might be desirable to use a multiple link-type conveyor. The shafts 22 are driven by a driveshaft 23 through the medium of gears 24. Shaft 23, driven by a reversible electric motor 25, is coupled to a reduction gear unit 26. Suitable means of any conventional type can be provided for operating the motor from a remote point. However, to insure against moving a vehicle too far the motor should be provided with a limit switch 27 which may be of the rotary type adapted to break the motor circuit or a control circuit after a given number of revolutions of the shaft 23.

On each of the shafts 22 at one side of each belt I provide a gear 30 which is keyed to the shaft for rotation therewith. The shafts also carry bell cranks 32, each of which supports a gear 33 in continual engagement with gear 30, the bell cranks being pivotally mounted on the shafts. The bell cranks are designed for use in moving the gears 33 from a position inboard of the platform to an outboard position where they can engage the gears 38 of the belts 17 of an appropriate storage space or those in the reception area. The bell cranks may be operated in any suitable manner and I merely show diagrammatically a solenoid means 39 for this purpose.

Normally the bell cranks are so positioned that the gears 33 are inboard of the sides of the platform as shown on the left-hand side of Fig. 3 but, as previously indicated, they can be operated to bring or move the gears 33 into driving engagement with the gears 38 of the conveyor of a selected storage space. Abutment means 40—41 can be provided to limit movement of the bell cranks.

For bridging the gap between the conveyors 15 and 17 I provide a freely rotatable roller 42 at the ends of each of the conveyors 15, each roller being carried upon a bell crank 32 at one end and upon an arm 43 mounted for pivotal movement on the shaft 22 at the other. Means (not shown) may be provided for limiting downward movement of the arms 43.

The gears 38 of conveyors 17 which are each connected to a roller 44 about which the conveyor belt passes so that when the parts are in the position in which they are shown in Figs. 4 and 5, movement of the drive mechanism on the platform will cause synchronized movement of the conveyors 15 and 17 through the gears 30, 33, and 38.

While the conveyors 17 should be freely movable when engaged to be driven by the drive mechanism of the platform, it may be necessary to prevent undesired movement of the conveyors when they are not so engaged as by providing brakes 45 (Figs. 2 and 6) normally operative to prevent movement of the conveyor belts. Any suitable means can be provided to release the brakes of the conveyors with which the drive means is engaged. For example, the bell cranks 32 can be used for this purpose as shown in Fig. 6.

In the operation of the device an automobile 14 is driven into the reception area 12' onto conveyors 17 therein so that the front wheels are on one conveyor and the rear wheels on the other. With the platform aligned with the reception area 12', solenoid means 39 is energized to move the bell cranks 32 on the appropriate side of the platform to the position of Figs. 4 and 5. The motor is then started in the appropriate direction to move the automobile onto the platform. The motor then stops, the bell cranks are returned to inboard position and the platform, assuming it to be an elevator, is then raised to the appropriate or desired floor of the garage storage facility and brought into alignment with a given storage stall 12. Controls are then operated to actuate the appropriate solenoids 39 for the purpose of moving gears 33 into engagement with gears 38 of the conveyors 17 of the selected storage stall. This also releases any brake mechanisms on the conveyors 17. The motor on the platform is then started to cause movement of the conveyors 15 toward the selected stall, resulting in sidewise movement of the automobile off the platform and into the stall area. The limit switch means 27 prevents any overrunning of the motor.

In like manner, assuming it is desired to retrieve an automobile in any of the storage areas, the platform is brought into alignment with the storage stall occupied by the given vehicle and the drive mechanism on the platform is operatively connected to the conveyors in the storage stall and the motor started in the appropriate direction to retrieve the vehicle from the stall.

I contemplate that in actual practice suitable electric control means would be provided so that a master control panel could be located in or near the reception area for controlling movement of the platform, the motor 25, and the solenoid means 39 for operating the bell cranks 32, whereby the parking or retrieving of a car would be fully automatic after manual actuation of a selected switch or switches at the control panel.

While in Figs. 1 and 2 I have illustrated the platform-elevator as being only wide enough to accommodate a single vehicle, I contemplate that the elevator may be wide enough to hold two or more vehicles side by side, thereby providing more efficient means for handling vehicles where the storage stalls are deep enough to accommodate more than one vehicle.

Although I have illustrated and described a preferred form of my invention, I contemplate that various changes and modifications can be made without departing from the invention, the scope of which is indicated by the following claim.

I claim:

In vehicle-handling apparatus, a movable platform, a vehicle storage space with which the platform can be aligned, an endless conveyor means extending across said platform for supporting a vehicle, an endless conveyor means in said storage space for supporting a vehicle, the conveyor means of said platform and that of said storage space being spaced in longitudinal alignment when said platform is aligned with said storage space, motorized drive means on said platform for operating the conveyor means thereon, and means for operatively connecting said drive means to the conveyor means in the storage space and for bridging the space between the conveyor means on said platform and the means in the storage space, comprising a drive wheel connected to said drive means, a bell crank pivotally mounted on the axis of said drive wheel, a driven idler wheel mounted on said bell crank in continual engagement with said drive wheel, a wheel operatively connected to the conveyor means in the storage space engageable by said driven idler wheel in a predetermined position of said bell crank, a roller carried in part by and movable with said bell crank having its axis of rotation coincident with said driven idler wheel, and means for pivoting the bell crank.

References Cited in the file of this patent

UNITED STATES PATENTS

| | | |
|---|---|---|
| 1,931,402 | Black | Oct. 17, 1933 |
| 1,955,959 | Harnischfeger et al. | Apr. 24, 1934 |
| 1,969,002 | Gleichman | Aug. 7, 1934 |